(No Model.)

D. FAULKNER.
COMBINED FISH PLATE AND NUT LOCK.

No. 262,031. Patented Aug. 1, 1882.

WITNESSES:
W. W. Hollingsworth
A. G. Syne

INVENTOR:
Daniel Faulkner
BY
ATTORNEYS.

N. PETERS, Photo-Lithographer, Washington, D. C.

UNITED STATES PATENT OFFICE.

DANIEL FAULKNER, OF PARIS CROSSING, INDIANA.

COMBINED FISH-PLATE AND NUT-LOCK.

SPECIFICATION forming part of Letters Patent No. 262,031, dated August 1, 1882.

Application filed June 2, 1882. (No model.)

*To all whom it may concern:*

Be it known that I, DANIEL FAULKNER, of Paris Crossing, in the county of Jennings and State of Indiana, have invented a new and useful Combined Fish-Plate and Nut-Lock, of which the following is a full, clear, and exact description, reference being had to the annexed drawings, forming part of this specification.

This invention consists in the combination, with the rails and the bolts and nuts, of a fish-plate of peculiar construction and a locking-bar adapted to engage with the fish-plate and the nuts, as hereinafter fully described.

Figure 1:
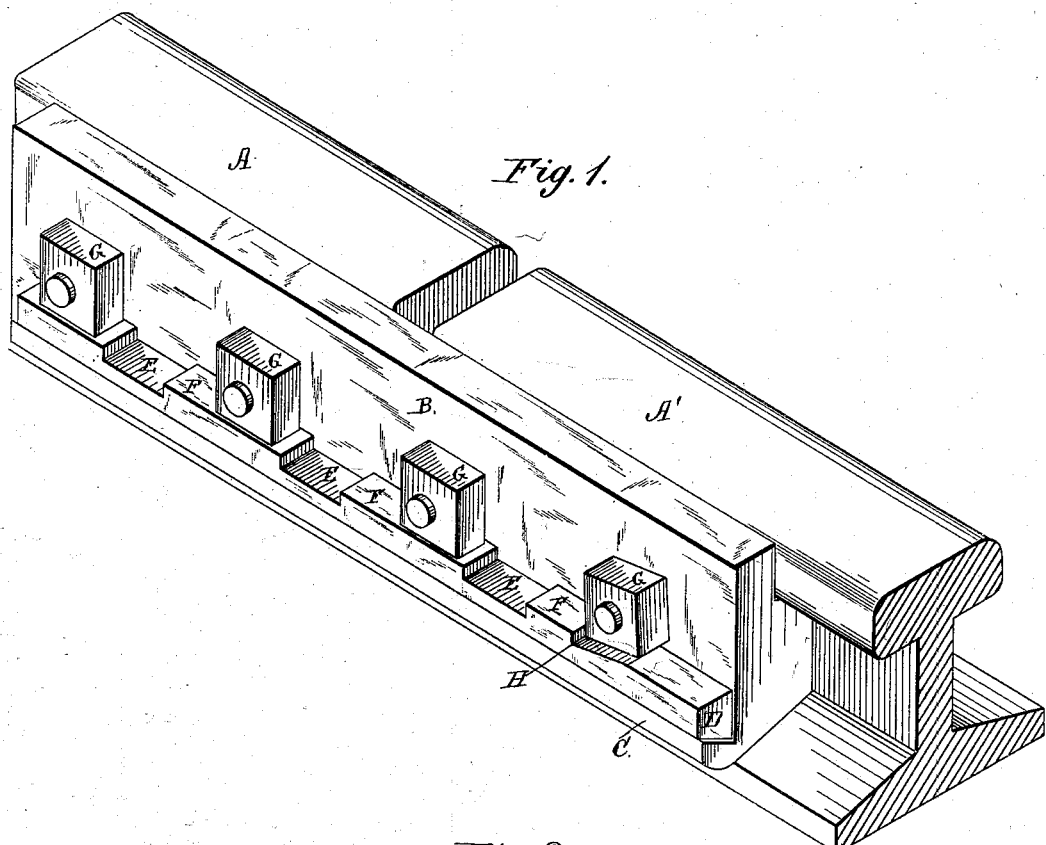
Figure 2:
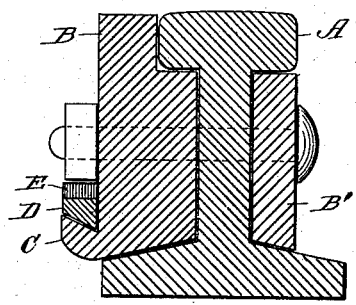

In the drawings, Figure 1 is a perspective view of my combined fish-plate and nut-lock, and Fig. 2 is a cross-section.

The railway-rails A A' are connected together between the fish-plates B B'. The plate B' is of ordinary construction, but the plate B is made of about twice the thickness of the other plate, and extends up to a level with the top of the rails, and is provided with a flange, C, extending along the lower edge thereof longitudinally. The flange C forms an acute angle with the plate B to prevent the key D, the lower edge of which is beveled to fit into the angle, from becoming laterally displaced therefrom. This key is constructed with recesses E in its upper surface at suitable intervals apart to leave projections F for engaging with and holding the nuts G, while a recess, H, having the form of an acute angle, is formed in the upper surface of the key, whereby the latter, which is inserted into position endwise, may be secured therein by turning one of the nuts into said recess. The object of the recesses E is to provide room for turning the nuts when it is desired to tighten or remove them, which room is secured by slightly moving the key longitudinally until the recesses are brought under the nuts, respectively.

With this construction it is made unnecessary to remove the key entirely from its seat when the nuts are to be tightened, and the key is securely held in place by the nut, which is slightly turned back to engage with the recess H. Before inserting the key in its seat the nuts are to be arranged with their lower edges on a line, which will provide just sufficient space to admit the key.

Having thus described my invention, what I claim, and desire to secure by Letters Patent, is—

The combination, with the rails and the fish-plate B', of the fish-plate B, having the flange C, the key D, having the recesses E and H, and the nuts, one of which is adapted to engage with the recess H, substantially as shown and described.

DANIEL FAULKNER.

Witnesses:
 A. G. LYNE,
 SOLON C. KEMON.